United States Patent [19]

Schenk

[11] 3,810,680
[45] May 14, 1974

[54] PRESSURE SUPPORTED MODULATOR
[75] Inventor: Donald E. Schenk, Dayton, Ohio
[73] Assignee: General Motors Corporation, Detroit, Mich.
[22] Filed: Nov. 29, 1972
[21] Appl. No.: 310,352

[52] U.S. Cl............ 303/6 C, 303/21 F, 188/181 A
[51] Int. Cl................................................ B60t 8/06
[58] Field of Search ...... 303/6 C, 84 A, 84 R, 21 F, 303/21 R, 61–63, 68–69, 10; 188/181 A

[56] References Cited
UNITED STATES PATENTS
3,671,085  6/1972  Pasek et al. ..................... 303/21 F
3,671,084  6/1972  Woodward........................... 303/10

Primary Examiner—Duane A. Reger
Assistant Examiner—D. C. Butler
Attorney, Agent, or Firm—D. D. McGraw

[57] ABSTRACT

A hydraulic brake pressure modulator having hydraulic pressure support for a displacement piston. The pressure support section of the modulator contains a solenoid valve which delivers a pilot pressure to a slave valve piston when brake pressure modulation is required. A piston is moved to open a release valve to reduce the modulator support pressure acting on the modulator displacement piston.

2 Claims, 2 Drawing Figures

PRESSURE SUPPORTED MODULATOR

The invention relates to a pressure supported modulator which is in a hydraulic pressure circuit and more particularly to such a modulator used in a hydraulic brake system. The modulator has a displacement cylinder section and a hydraulic support section. The displacement cylinder section contains a double acting bypass valve which is activated by an actuator piston, and a primary check valve which is activated by a displacement piston. The actuator piston is supported by a hydraulic piston in the hydraulic support section. The effective area of the hydraulic piston is a multiple of the effective area of the bypass valve. The displacement piston has one end in the hydraulic support section with an effective area which is a multiple of the effective area of the end which is positioned in the displacement cylinder section. The hydraulic support section contains a solenoid valve which provides a pilot pressure to a slave piston operating a release valve. The slave piston has an effective area which is a multiple of the effective area of the release valve.

The modulator embodying the invention is illustrated as being used in a hydraulic brake system having a hydraulic boost pressure source, a hydraulic booster powered by boost pressure from the source, a master cylinder actuated by the booster, first and second brake pressure hydraulic circuits connecting the master cylinder to first and second sets of brakes, and a wheel lock control sensor and logic mechanism generating a wheel lock control signal. The modulator is positioned in one of the brake pressure circuits to modify the braking action of the set of brakes connected thereto in accordance with the wheel lock control signal. Pressure from the hydraulic boost pressure source is used to provide support pressure to the modulator.

Figure 1:
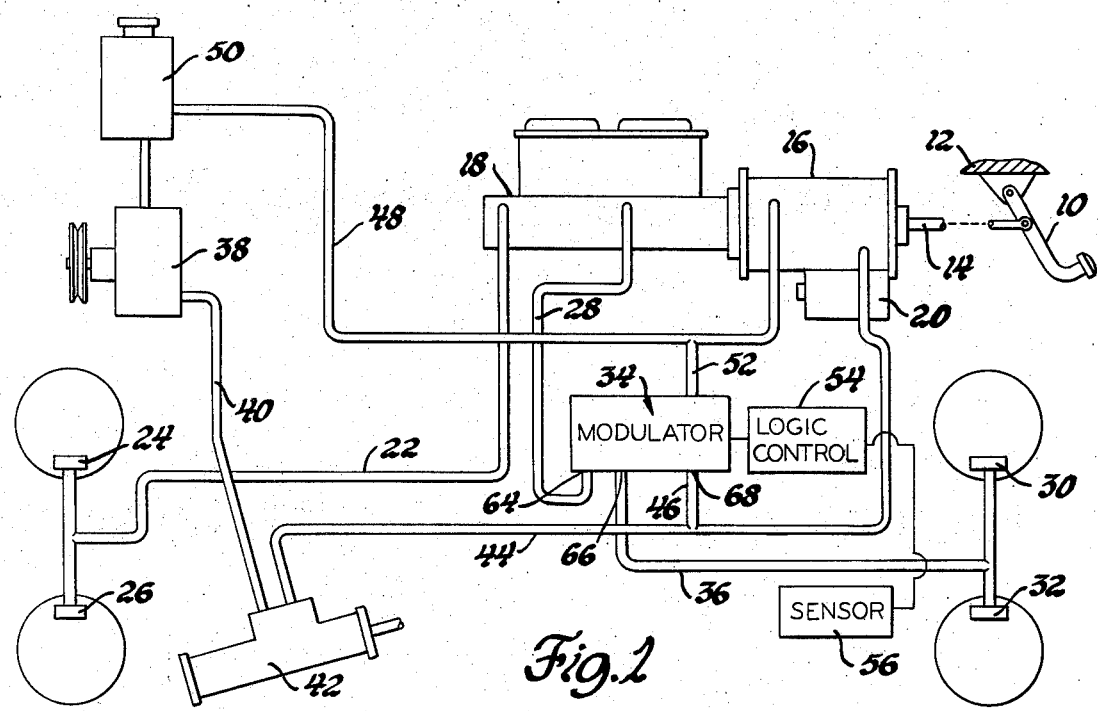
FIG. 1 is a schematic diagram showing a brake system including a modulator embodying the invention.

The brake system shown in FIG. 1 includes a brake pedal 10 suitably mounted on a portion 12 of a vehicle so as to be operated by the vehicle operator to actuate the vehicle brakes. The pedal is connected through push rod 14 to a hydraulic brake booster 16 which is connected to the master cylinder assembly 18 for master cylinder operation. An auxiliary pump 20 is mounted on the booster 16 and provides boost pressure under certain types of operation when the primary supply of boost pressure is not available. A conduit 22 connects the master cylinder with the front set of brakes 24 and 26, and conduit 28 connects the master cylinder with the rear set of brakes 30 and 32 through the modulator 34 and conduit 36.

The system also includes the power steering system of the vehicle. The power steering pump 38 is suitably driven by the vehicle engine and is connected by conduit 40 to the power steering gear 42, which is of the open center type. The outlet of power steering gear 42 is connected by conduit 44 to the brake booster 16, with a conduit branch 46 also connected to supply boost pressure to the modulator 34. Conduit 48 connects the outlet of the booster power head 16 to the power steering pump reservoir 50, with a branch 52 of the conduit 48 connecting the modulator 34 to that conduit. As is schematically illustrated, the modulator is connected with a wheel lock control mechanism including the logic control 54 and the sensor 56. As is well known in the wheel lock control art, sensor 56 may sense insipient wheel lock of the rear wheels, for example, and send appropriate signals to the logic control 54 to generate a wheel lock control signal for the modulator 34. The signal actuates the modulator to cause a decrease of brake apply pressure at the rear wheel brakes, permitting the rear wheels to roll within a desirable range of per cent wheel slip instead of locking.

The modulator 34 has a hydraulic support section 58 and displacement cylinder section 60 contained within the modulator housing 62. The housing has an inlet port 64 connected to conduit 28 to receive rear brake supply pressure from the master cylinder 18, and an outlet port 66 connected to conduit 36 to deliver rear brake apply pressure to the rear brakes 30 and 32. Inlet 64 and outlet 66 are in the portion of housing 62 containing the displacement cylinder section 60 of the modulator. Housing 62 also has an inlet port 68 connected with conduit branch 46 to receive boost pressure from the power steering gear pump 38 through conduit 40, the open center power steering gear 42, and conduit 44. Outlet port 70 connects the modulator with conduit branch 52 to return hydraulic booster fluid to the reservoir 50 through conduit 48.

The displacement cylinder section 60 has a bypass valve chamber 72 formed as an enlarged part of a passage 74. One end of chamber 72 is closed by a head nut 76 through which a passage 78 extends so as to connect with the recess 80, formed in head nut 76 as an extension of passage 74, and inlet 64. A shoulder 82 divides chamber 72 from a smaller diameter portion 84 of passage 74. A primary check valve chamber 86 is provided in the displacement cylinder section 60 and is spaced from chamber 72 but joined therewith by a passage 88 which is fluid connected to passage 78. One end of chamber 86 is closed by a head nut 90 and the other end is defined by a wall 92 having an aperture 94 formed therein. The section 96 of the displacement cylinder is formed in section 60 with one end also being defined by wall 92 and connecting with aperture 94. That end cooperates with an end land 98 of the displacement piston 100 to define the displacement chamber 102. Piston 100 has a projection 104 extending through aperture 94 with sufficient radial clearance to provide no effective restrictions. A primary check valve 106 is mounted in chamber 86. The valve is urged toward wall 92 by spring 108 and, in the position shown, engages projection 104 so that the valve collar seal 110 is spaced from the wall to permit unrestricted fluid flow through chamber 86 and opening 94 into chamber 102. A passage 112 in the housing of section 60 connects chamber 102 with the smaller diameter portion 84 of passage 74 adjacent shoulder 82.

The displacement piston 100 extends outwardly of cylinder 96 and into cylinder 114 formed in the hydraulic support section housing. Cylinder 114 has a larger diameter than does cylinder 96 and displacement piston 100 has a larger land 116 formed on its end received in cylinder 114. The chamber 118 is defined by the end 120 of cylinder 114 and land 116. Piston return spring 122, located in chamber 118, urges piston 100 rightwardly to the position shown in FIG. 2. Another chamber 124 is located between the hydraulic support section 58 and the displacement cylinder section 60 and is also between lands 98 and 116. It is also open to the end of passage 74 opposite chamber 72 and recess 80.

Inlet 68 is connected with a check valve chamber 126 and ball check valve 128 is received in that chamber. It is spring loaded by spring 130 to seat against valve seat 132 but to open when slight boost pressure is introduced through inlet 68. A passage 134, in alignment with passage 74, connects chamber 126 and a cylinder 136 which is formed as an enlarged end of passage 134 opening into chamber 124. Hydraulic piston 138 is reciprocably received in cylinder 136 and has one end 140 exposed to hydraulic fluid in the end of passage 134 connected with chamber 126. The other end 142 of piston 138 abuts the end 144 of actuator piston 146. The actuator piston is reciprocably received in passage 74 and has a bypass valve 148 formed on the end opposite its end 144 and received in chamber 72. Portion 150 of actuator piston 146 in alignment with passage 112 is of smaller diameter than passage portion 84. A side-sealing rubber-like valve collar 152 fits on bypass valve 148 so that it is sealingly engageable with shoulder 82 to close off communication between passage portion 84 and chamber 72 when the actuator piston is in the position shown in FIG. 2. A spring 154 in the recess 80 urges actuator piston 146 to this position. Another rubber-like collar or ring 156 is mounted on bypass valve 148 in axially spaced relation to collar 152 and is engageable with a valve seat 158, and also after 76, formed on the inner end of head nut 76 when actuator piston 146 is moved sufficiently rightward against the force of spring 154. Outlet 66 leading to the set of rear brakes connects with chamber 72 between shoulder 82 and valve seat 158.

Check valve chamber 126 is connected with a passage 160 which extends generally perpendicular to passage 134 and cylinder 114 so that it intersects a passage 162 which is in axial alignment with cylinder 114 and connects with that cylinder and boost pressure outlet 70. Passage 160 continues beyond passage 162 and has its end opposite chamber 126 opening into outlet chamber 164. A passage 166 generally parallel to passage 134 connects with passage 160 adjacent chamber 126 and opens into chamber 118. An apply flow control orifice 168 is positioned in the end of passage 166 where it joins chamber 118.

Passage 162 has a release flow control orifice 170 positioned in it where it joins with chamber 118, and has a reduce diameter section 172 forming a valve seat for release valve 174. This valve is positioned between flow control orifice 170 and the valve seat 172 and is spring loaded by spring 176 to close against the seat. Slave piston 178 has an extension 180 extending through valve seat 172 and engageable with valve 174. Slave piston 178 is reciprocably received in the portion of passage 162 between the valve seat 172 and the point where passage 160 intersects passage 162. A passage 182 joins outlet chamber 164 and passage 162 immediately adjacent valve seat 172 and on the opposite side thereof from valve 174. The left end of passage 162 is closed by a plug 184 so that outlet 70 is connected through a passage 186 formed in the plug 184 with a passage 188 providing fluid communication with outlet chamber 164.

A valve sleeve 190 is positioned in the lower portion of passage 160 with its upper end being secured to the annular high pressure valve seat 192 and its lower end being secured to the annular low pressure seat 194. The portion of sleeve 190 extending through passage 162 has ports 196 connecting the inner portion of the sleeve immediately below seat 192 with passage 162 between plug 184 and slave piston 178. A poppet valve 198 is reciprocably mounted in the lower end of sleeve 190 so that its lower valve end 200 is engageable with lower valve seat 194 to close that seat when the poppet valve is in the downward position. The upper end of poppet valve 198 has a needle-like end 202 fitting high pressure seat 192 to permit fluid flow through the seat when open. Spring 204 urges the valve to move upwardly to normally keep seat 192 closed. Poppet valve 198 is fluted intermediate its ends 200 and 202 to permit passage of fluid from the control valve chamber 206 when lower valve end 200 is positioned away from the low pressure seat 194 and high pressure seat 192 is closed by the shoulder on valve end 202.

An electrically energized solenoid coil 208 is positioned about the lower end of sleeve 190 and low pressure seat 194 with poppet valve 198 being the movable armature of the solenoid. The solenoid coil is contained within the magnetic return path member solenoid housing 210, which abuts projections 212 formed in the cover 214 closing outlet chamber 164. The outlet 216 of low pressure seat 194 is connected with outlet chamber 164.

Figure 2:
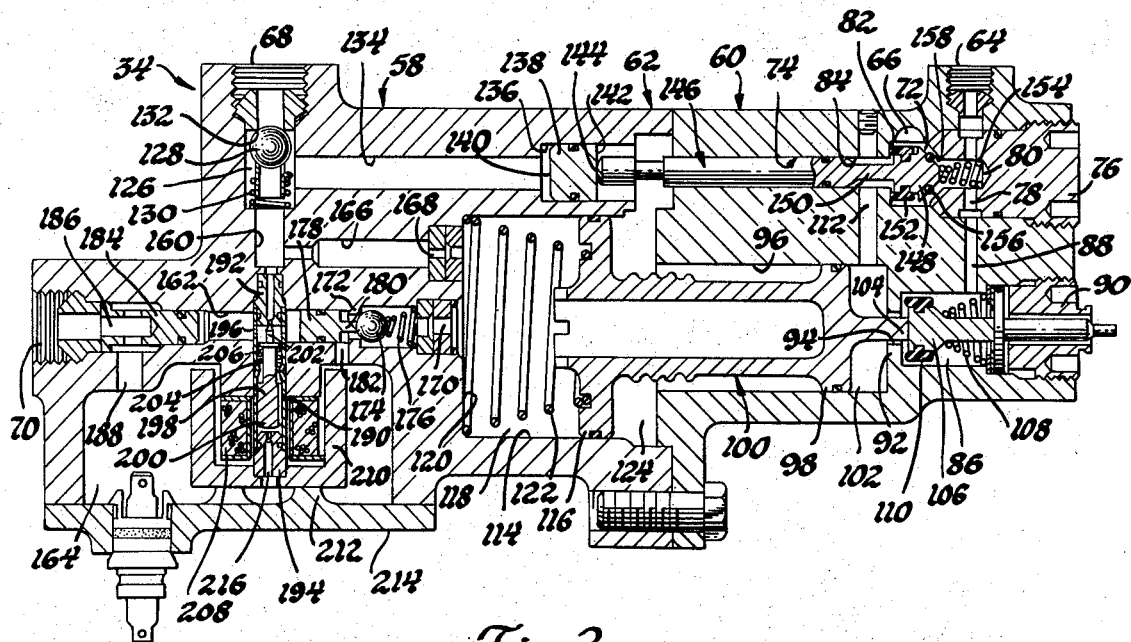
FIG. 2 is a cross-section view of the modulator embodying the invention.

Before the brake is applied, all of the modulator components are in the positions shown in FIG. 2. With the vehicle engine running, pump 38 is being driven to deliver a steady flow on the order of 4 g.p.m. The fluid passes through power steering gear 42 and the booster 16 and returns to the pump 38 through reservoir 50. Since there is no restriction to this flow, there is no appreciable pressure in the system and check valve 128 remains seated. When the vehicle brake pedal 10 is applied, a back pressure is built up to actuate booster 16 and this pressure is sufficient to open check valve 128.

The back pressure, which is boost pressure, enters passage 134, passage 160, and passage 166 past valve 128. It passes through the apply flow control orifice 168 and into chamber 118. In the chamber it acts on displacement piston 100, urging the piston to the right. The pressure also passes through release flow control orifice 170 and into the release valve chamber containing release valve 174 and spring 176. The pressure acts on end 140 of hydraulic piston 138, urging that piston rightwardly and therefore urging the actuator piston 146 rightwardly. Bypass valve 148 is moved rightwardly by piston 146 so that collar 152 moves away from shoulder 82 to communicate passage 112 with outlet port 66 through chamber 72. The collar or ring 156 engages the valve seat 158, preventing the passage of brake apply pressure fluid directly from the inlet port 64 to the outlet port 66 through chamber 72.

In an embodiment of the system, the hydraulic brake booster 16 may have a 3:1 boost ratio. Therefore a brake apply pressure three times the boost pressure at inlet 68 is applied to the bypass valve 148 urging it leftwardly, and is also applied in displacement chamber 102 urging displacement piston 100 leftwardly. However, the effective area of the actuator support piston 138 is about four times as great as the effective area of the bypass valve 148. This arrangement permits the bypass valve to be moved rightwardly by the force acting on piston 138 due to pressure in passage 134. Although the brake apply pressure in chamber 102 is three times that of the boost pressure in chamber 118, the effective area of the end of piston 100 exposed to chamber 118 is more than three times the effective area exposed to chamber 102. For example this area ratio may be about 4.5:1. Therefore the primary check valve 106 is held in the open position shown in FIG. 2. This allows brake apply pressure fluid to pass substantially unrestrictedly from the inlet 64 past the primary check valve 106, through aperture 94, chamber 102, passage 112, and chamber 72 to the outlet 66.

When the brakes are applied as above described, the needle valve 202 of poppet valve 198 is held against the high pressure seat 192 and the lower valve end 200 is held away from the low pressure seat 194 by the spring 204. The solenoid side of the slave piston 178 is vented to low pressure and release valve 174 is closed. This insures that full boost pressure will be applied in chamber 118 to the support side of the displacement piston 100. When incipient wheel lock is sensed by sensor 56, the logic control 54 causes solenoid coil 208 to be energized. This moves poppet valve 198 downwardly to close the valve lower end 200 against the low pressure seat 194 and pulls needle valve 202 away from the high pressure seat 192. The boost pressure already in passage 160 passes through the high pressure valve seat 192 and through ports 196 into passage 162. The boost pressure is therefore applied to the solenoid side of slave piston 178, forcing this piston rightwardly to move the release valve 174 from its seat 172, allowing fluid to flow from chamber 118 through the release flow control orifice 170, valve seat 172, passage 182, chamber 164, passage 188, and passage 186 to outlet port 70. The release flow control orifice 170 is of such a size that the flow through it is about four times as great as the flow through the apply flow control orifice 168. This results in a controlled reduction of support pressure in chamber 118. The brake apply pressure in chamber 102 acting on piston 100 then forces that piston leftwardly, increasing the displacement of the rear brake system and lowering the rear brake apply pressure. This decreases the braking effort on the rear wheels, allowing the wheels to accelerate away from the incipient wheel lock condition.

Deenergization of solenoid coil 208, in response to sensed changes in the rear wheel operating condition indicating that incipient wheel lock is no longer present, permits spring 204 to move needle valve 202 upwardly to again close high pressure valve seat 192. This allows the high pressure on the solenoid side of slave piston 178 to be vented through valve 200 and outlet 216. Therefore release valve 174 reengages its seat 172 as slave piston 178 moves leftwardly. This allows the support pressure in chamber 118 to increase at a rate controlled by the apply flow control orifice 168. This increasing support pressure acts on the support side of displacement piston 100, moving the piston rightwardly as seen in FIG. 2 to decrease the rear brake system displacement and increase the rear brake apply pressure. Full boost pressure is applied to the bypass valve actuator piston 138 during the entire cycle.

If the brakes are applied when booster 16 is inoperative, the bypass valve 148 remains in the position shown in FIG. 2 due to the lack of an actuating force on piston 138. The brake apply pressure fluid is allowed to continue to flow substantially unrestrictedly from the inlet 64 to the outlet 66 past valve elements 156 and 158. The brake apply pressure in chamber 102 will act to move the displacement piston 100 leftwardly to close the primary check valve 106, preventing excess brake apply fluid from entering the displacement cylinder chamber 102 through aperture 94. The bypass valve 148 remains sealed against shoulder 82, preventing excess apply pressure fluid from entering chamber 102 through passage 112. Therefore the wheel lock control portion of the modulator is rendered inoperative when there is no booster pressure available and the brake apply pressure fluid is allowed to move substantially unrestrictedly from the master cylinder 18 to the rear brakes 30 and 32.

What is claimed is:

1. A modulator for a hydraulic pressure circuit comprising:

a first inlet from a first source of hydraulic pressure subject to selective pressure application and release;

a first outlet for normally delivering hydraulic pressure to a pressure actuated device in the hydraulic pressure circuit from the first source of hydraulic pressure when pressure is applied to said inlet;

a bypass valve having a normally open valve section fluidly connecting said inlet and said outlet and a normally closed valve section having one side fluidly connected to said outlet;

a check valve having means yieldably urging it closed and positioned in parallel fluid flow relation with said bypass valve normally open valve section with first inlet pressure acting to also urge said check valve to the closed position;

cylinder means having a reciprocable displacement piston therein defining a displacement chamber on one side of the displacement piston and a pressure chamber on the other side of the displacement piston, said displacement chamber being fluid connected downstream of said check valve and to the other side of said bypass valve normally closed valve section, said displacement piston having means normally holding said check valve open, and movable in a direction increasing the volume of said displacement chamber to permit closure of said check valve;

a bypass valve actuator piston subject to an applied pressure above a predetermined level to respectively close and open said bypass valve normally open and normally closed valve sections;

a second inlet from a second source of hydraulic pressure, said second inlet being fluid connected to said bypass valve actuator piston to deliver the applied pressure thereto and also being fluid connected to said pressure chamber through a first flow control passage;

a second outlet having passage means connected therewith with valve means therein selectively fluid connecting said second inlet with said second outlet and said pressure chamber with said second outlet, said passage means including a second flow control passage fluidly intermediate said pressure chamber and said second outlet;

and modulator control means operating said valve means in response to signals requiring modulation of the first outlet delivered hydraulic pressure to fluidly connect said pressure chamber and said second outlet to move said displacement piston to close said check valve and increase the volume of said displacement chamber to decrease the pressure at said first outlet independently of the pressure at said first inlet.

2. In a hydraulic brake system having a boost pressure source, a hydraulic booster powered by boost pressure from said source, a master cylinder actuated by said booster, first and second brake apply pressure circuits connecting said master cylinder to first and second sets of brakes, and a wheel lock control sensor and logic mechanism generating a wheel lock control signal:

a modulator for modulating brake apply pressure in one of said circuits to modify the braking action of the set of brakes connected thereto in accordance with said signal, said modulator comprising:

a housing having formed therein a stepped cylinder having a larger area end and a smaller area end and having a similarly stepped piston reciprocably received therein to define therewith a pressure chamber at the larger area end and a displacement chamber at the smaller area end;

a first inlet and a first outlet connected in said one circuit with said inlet on the master cylinder side and said outlet on the brake set side;

first passage means including a bypass valve chamber having first and second bypass valve seats on opposite sides thereof and a bypass valve therein movable from one to the other of said bypass valve seats and having yieldable means urging said bypass valve to close said first bypass valve seat, said first outlet being fluidly connected to said bypass valve chamber fluidly intermediate said first and second bypass valve seats, and a check valve chamber having an annular check valve seat and a check valve therein movable to open and close said check valve seat and yieldable means urging said check valve toward said check valve seat, one side of said check valve chamber being fluidly connected to said first inlet and the other side being fluidly connected through said check valve seat and said displacement chamber and said first bypass valve seat and said bypass valve chamber to said first outlet;

said stepped piston having an extension thereon extending through said annular check valve seat and normally holding said check valve away from said check valve seat;

a second inlet and a second outlet respectively connected to receive boost pressure from said source and to return fluid to said source;

second passage means including a control valve chamber having a first control valve seat fluidly connected to said second inlet and a second control valve seat fluidly connected to said second outlet and a control valve therein alternatively closing and opening said control valve seats and having yieldable means acting thereon to normally close said first control valve seat, an apply flow control passage fluidly connected with said second inlet and said pressure chamber, a release flow control passage permitting a substantially greater maximum flow therethrough than said apply flow control passage and having a normally closed release control valve therein controlling the passage of fluid therethrough, said release control flow passage fluidly connecting said pressure chamber and said second outlet subject to said release control valve, a cylinder passage connecting said control valve chamber with said release flow control passage downstream of said release control valve and having a reciprocable release control valve actuating piston sealingly received therein and acting to open said release control valve under influence of a predetermined pressure in said control valve chamber, and a bypass valve actuating cylinder fluidly connected with said second inlet and having a piston reciprocably movable therein and operatively engaging said bypass valve and acting thereon in response to a predetermined pressure entering said second inlet to move said bypass valve to open said first bypass valve seat and close said second bypass valve seat; and means responsive to said wheel lock control signal to move said control valve to open said first control valve seat and close said second control valve seat during braking to apply boost pressure to said release control valve actuating piston to open said release control valve to permit greater fluid flow out of said pressure chamber through said release flow control passage than is permitted to flow into said pressure chamber through said apply flow control passage to decrease the pressure in said pressure chamber and permit movement of said stepped piston under influence of brake apply pressure acting in said displacement chamber to permit said first check valve to close and to increase the volume of said displacement chamber to decrease the brake apply pressure at said one brake set independently of the brake pressure at said first inlet to decrease the braking effect of said brake set to control wheel lock, and upon cessation of said signal to permit said control valve to close said first control valve seat and open said second control valve seat to release boost pressure in said control valve chamber to said second outlet to permit closure of said release control valve and pressure to increase in said pressure chamber to move said stepped piston to decrease displacement chamber volume and thereby increase brake apply pressure to said brake set and open said first check valve to fluidly reconnect said first inlet and said first outlet.

* * * * *

UNITED STATES PATENT OFFICE
CERTIFICATE OF CORRECTION

PATENT NO. : 3,810,680
DATED : May 14, 1974
INVENTOR(S) : Donald E. Schenk

It is certified that error appears in the above—identified patent and that said Letters Patent are hereby corrected as shown below:

Column 3, lines 29 and 30, "and also after 76," should be deleted.
Column 3, line 30, after "head nut 76" a comma -- , -- should be inserted.

Signed and sealed this 17th day of June 1975.

(SEAL)
Attest:

RUTH C. MASON
Attesting Officer

C. MARSHALL DANN
Commissioner of Patents
and Trademarks